Feb. 22, 1966   R. D. WHITE   3,236,476
HEAT INSULATION FOR HYPERSONIC VEHICLES
Filed Jan. 10, 1961

INVENTOR.
Richard D. White
BY
Reynolds & Christensen
ATTORNEYS

3,236,476
HEAT INSULATION FOR HYPERSONIC VEHICLES
Richard D. White, Bellevue, Wash., assignor to The Boeing Company, a corporation of Delaware
Filed Jan. 10, 1961, Ser. No. 81,749
4 Claims. (Cl. 244—1)

It is known that the metal lithium, when correctly applied and arranged relative to a skin or other structure, as of a hypersonic vehicle, is an excellent coolant. It is lighter than any other metal, is capable of absorbing large quantities of heat without exceeding temperatures that are safe for the protected skin, and especially it has a high latent heat of vaporization. Being light, it imposes a minimum weight penalty on soaring vehicles, or on missiles. Having the high latent heat of vaporization and a boiling point at high altitudes sufficiently low to afford effective protection to structure, it is a desirable coolant. It remains, however, to arrange and apply it in such manner that it is dissipated relatively slowly or gradually, to the end that its insulating effect persists throughout a flight lasting a material length of time. It is to the latter end that the present invention is directed.

Also, while an arrangement of lithium for cooling the skin of such a vehicle is disclosed and claimed in a companion application of Henry K. Hebeler, Serial No. 81,746, filed January 10, 1961, and now U.S. Patent 3,089,318, that arrangement is not well adapted for use about sharp leading edges, noses, or the like, and it is an object of this invention to provide insulation making use of lithium as a coolant and capable of use at such locations, in addition to its capability in other locations, such as the slightly contoured skin of a vehicle's wing, body, or the like.

The invention comprises the novel heat insulation, for uses and in locations such as have been indicated, as shown in a representative form in the drawing, and as explained herein and defined in the claims.

Figure 1:
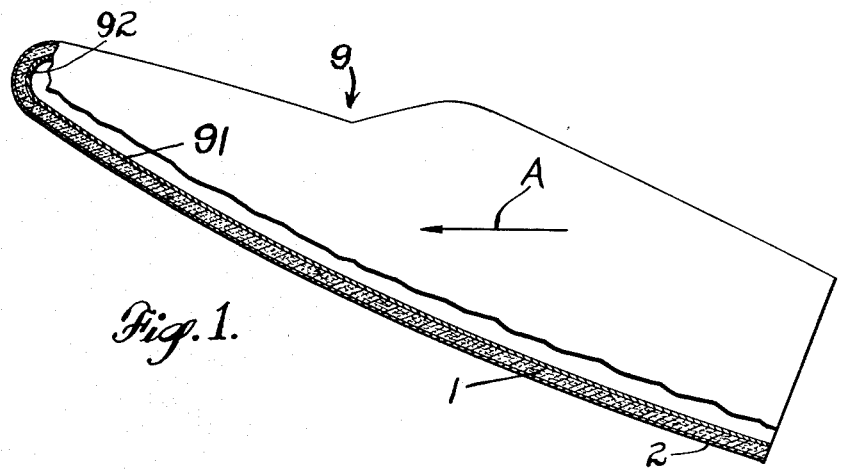
FIGURE 1 is an outline side elevational view, partly in section, showing the invention applied to a manned vehicle.
Figure 2:
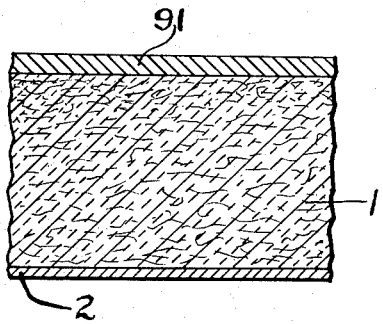
FIGURE 2 is an enlarged sectional view through the insulation and the protected skin, before the insulation becomes operative.
Figure 3:
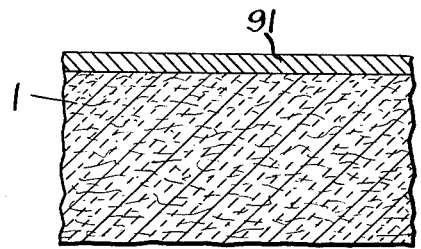
FIGURE 3 is a similar view showing the insulation during its operation.

By way of example a manned hypersonic vehicle 9 is shown in FIGURE 1, proceeding in the direction indicated by the arrow A, and in an attitude such as it might assume at high altitude. Its skin or shell 91 must be heat insulated, and in particular although not exclusively its nose 92 must be so protected. A heat insulation using lithium as a coolant is disclosed in the companion application but that invention is not well adapted for installation about such a nose or other sharp curvature, whereas this invention is so adapted. In areas where both this and the Hebeler installation can be used, it might be found desirable to install both.

The present invention contemplates the use of a sponge-like mass or blanket, as at 1, adhered to the exterior of the skin or shell 91, which mass is impregnated with the lithium. Since lithium melts at 354° F. it may readily be caused to impregnate the mass, and when cooled solidifies in place.

The sponge-like mass may be one of several materials. Spun quartz fibers make an excellent sponge, but another suitable material is molybdenum sponge. While lithium is the preferred coolant, because of its properties mentioned above, it may be that sodium, potassium, caesium, bismuth or magnesium will serve.

The insulating, impregnated blanket is adhered to the exterior of the skin or shell 91, taking care that the blanket and not merely the coolant is adhered. Mechanical fasteners may be employed, or adhesion may be effected in any suitable manner. A protective cover 2 of suitable organic and metallic materials should overlie the the blanket 1, to protect the latter and its coolant against the short duration and lower heat input of the boost and acceleration period. This cover may be designed in different areas in accordance with the heat to which it will be subjected in those areas during the boost and acceleration period, for example, by varying the thickness of the cover. However, the design of the cover will not materially affect the performance of the insulating impregnated blanket during other higher heat flux periods for which the blanket is designed.

When heating occurs in the range requiring the protection of the coolant, the cover 2, if used, is dissipated, and the blanket 1 is exposed to the air. The lithium at the surface first melts and then vaporizes, dissipating the heat in the atmosphere, and leaving the sponge-like mass. This mass holds the liquid lithium, as a sponge. As the lithium at the surface vaporizes and leaves the blanket, the quartz fibers in the unsaturated outer layer erode away, and the initially deeper lithium is subjected to direct heating. The eroding quartz will partially insulate the underlying lithium, and slow down the dissipation of the entire insulation. If the quartz cools, it becomes liquid and when it solidifies produces a smooth outer surface.

By such a delayed erosion and loss of coolant by boiling away the insulating material is afforded a relatively long life, adequate for flights contemplated for such vehicles. If found desirable, the thickness of the blanket may vary in different areas, to afford to those areas most subject to heating protection lasting as long as the protection of areas less subject to heating.

I claim as my invention:

1. On the closed outer shell of a vehicle designed for hypersonic flight, an insulating blanket which is directly adhered to the exposed outside surface of the shell so as to be in heat conductive contact therewith and which comprises a continuous sponge-like matrix that is directly affixed to such surface and substantially filled out with an uncombined coolant metal which lies embedded in the voids of the matrix in a solidified state at ordinary temperatures, but which fuses in hypersonic flight so as to wet the shell and to cool the same by vaporizing into the ambient surroundings from the exposed face of the matrix, and an outer covering that is superposed on the exposed face of the matrix and formed from a material which is heat-dissipative under the aerodynamic conditions of prolonged hypersonic flight, but which absorbs sufficient heat, without substantial dissipation, during short-term exposure to aerodynamic heating, to prevent substantial vaporization of the coolant metal for the length of such term.

2. A vehicle according to claim 1 wherein the coolant metal is selected from the group consisting of sodium, potassium, caesium, bismuth, magnesium, and lithium.

3. A vehicle according to claim 1 wherein the sponge-like matrix is formed from a material selected from the group consisting of spun quartz fibers and molybdenum sponge.

4. On a body at least one major surface of which is to be exposed to a supersonic air stream flowing thereover, an insulating blanket which is directly adhered to said surface so as to be in heat conductive contact with the body, and which comprises a continuous sponge-like matrix that is directly affixed to the surface and substantially filled out with an uncombined coolant metal which lies embedded in the voids of the matrix in a solidified state at ordinary temperatures, but which fuses when the blanket is exposed to the air stream so as to wet the body and to cool the same by vaporizing into the ambient surroundings from the exposed face of the matrix, and an outer covering that is superposed on the exposed face of the matrix and formed from a material which is heat-dissipative under the aerodynamic conditions of prolonged exposure to the air stream, but which absorbs sufficient heat, without substantial dissipation, during short-term exposure to aerodynamic heating, to prevent substantial vaporization of the coolant metal for the length of such term.

References Cited by the Examiner

UNITED STATES PATENTS

| | | | |
|---|---|---|---|
| 1,580,199 | 4/1926 | Hering | 154—44.15 |
| 1,792,784 | 2/1931 | Trent | 165—180 |
| 2,468,820 | 5/1949 | Goddard | 102—92.5 |
| 2,671,955 | 3/1954 | Grubel et al. | 92—182.1 |
| 2,763,570 | 9/1956 | Shephard et al. | 117—51 |
| 2,908,455 | 10/1959 | Hoadley | 62—239 |
| 2,922,291 | 1/1960 | Fox et al. | 62—239 |
| 2,941,759 | 6/1960 | Rice et al. | 62—239 |
| 3,026,806 | 3/1962 | Runton et al. | 62—239 X |
| 3,089,318 | 5/1963 | Hebeler | 62—239 |

EARL M. BERGERT, *Primary Examiner.*

CARL F. KRAFFT, *Examiner.*

H. F. EPSTEIN, *Assistant Examiner.*